US012480359B2

(12) United States Patent
Black et al.

(10) Patent No.: US 12,480,359 B2
(45) Date of Patent: Nov. 25, 2025

(54) COVER WITH ADJUSTABLE WIDTH

(71) Applicant: OXFORD SAFETY COMPONENTS LIMITED, Oxfordshire (GB)

(72) Inventors: John Alexander Black, Oxfordshire (GB); Robert David Black, Oxfordshire (GB)

(73) Assignee: OXFORD SAFETY COMPONENTS LIMITED, Oxfordshire (GB)

( * ) Notice: Subject to any disclaimer, the term of this patent is extended or adjusted under 35 U.S.C. 154(b) by 660 days.

(21) Appl. No.: 17/631,097

(22) PCT Filed: Jul. 13, 2020

(86) PCT No.: PCT/GB2020/051682
§ 371 (c)(1),
(2) Date: Jan. 28, 2022

(87) PCT Pub. No.: WO2021/019203
PCT Pub. Date: Feb. 4, 2021

(65) Prior Publication Data

US 2022/0251898 A1 Aug. 11, 2022

(30) Foreign Application Priority Data

Jul. 31, 2019 (GB) ..................................... 1910947

(51) Int. Cl.
*E06B 9/06* (2006.01)
*E04H 5/06* (2006.01)

(52) U.S. Cl.
CPC ............ *E06B 9/0661* (2013.01); *E04H 5/06* (2013.01); *E06B 9/063* (2013.01)

(58) Field of Classification Search
CPC ........... E06B 2009/1583; E06B 9/0661; E06B 9/0653; E06B 9/063; E06B 9/0623;
(Continued)

(56) References Cited

U.S. PATENT DOCUMENTS 1,459,522 A * 6/1923 Woods ...................... E06B 9/01 160/223
1,550,713 A * 8/1925 Springer ............... E06B 9/0661 160/159

(Continued)

FOREIGN PATENT DOCUMENTS

DE 2941755 A1 4/1981
GB 2472798 A 2/2011

(Continued)

OTHER PUBLICATIONS

Combined Search and Examination Report for corresponding UK Patent Application GB1910947.9, dated Sep. 30, 2019, 4 pp.

(Continued)

*Primary Examiner* — Abe Massad
(74) *Attorney, Agent, or Firm* — Taft Stettinius & Hollister LLP

(57) ABSTRACT

A cover for covering an opening defined in a surface, the opening defined between a first edge and a second edge, and defining an opening width therebetween, shorter than a length of the opening, the cover having a cover width and configured to be supported, in use, at the first edge and the second edge of the opening when the cover width is parallel to the opening width, wherein the cover width is adjustable from a first cover width to a second cover width, and wherein the cover is configured to maintain the cover width at the second cover width, in use.

10 Claims, 3 Drawing Sheets

(58) Field of Classification Search
CPC ....... E06B 9/01; E06B 2009/015; E04H 5/06; E04H 17/143
See application file for complete search history.

(56) References Cited

U.S. PATENT DOCUMENTS

| | | | | | |
|---|---|---|---|---|---|
| 1,662,117 | A * | 3/1928 | Kuhl | E06B 9/01 | 49/55 |
| 4,006,768 | A * | 2/1977 | Horgan, Jr. | E06B 9/063 | 160/159 |
| 4,352,322 | A | 10/1982 | Brauer | | |
| 4,583,278 | A * | 4/1986 | Flores | E04H 17/26 | 33/645 |
| 4,762,242 | A * | 8/1988 | Harris | E04H 5/06 | 220/345.5 |
| 4,817,334 | A * | 4/1989 | Badger | E06B 9/01 | 49/55 |
| 4,966,217 | A * | 10/1990 | Dechambeau | E04H 5/06 | 160/35 |
| 5,535,803 | A * | 7/1996 | Pretorius | E06B 9/063 | 160/136 |
| 5,738,160 | A * | 4/1998 | Rice | E04H 5/06 | 160/378 |
| 6,412,234 | B1 * | 7/2002 | Leoni | E06B 9/0661 | 160/159 |
| 6,799,534 | B1 * | 10/2004 | Wang | B60R 21/06 | 119/412 |
| 7,377,489 | B1 * | 5/2008 | Houseman | E04H 17/143 | 33/645 |
| 2007/0245631 | A1 * | 10/2007 | Yi | E06B 9/0661 | 49/55 |
| 2011/0258932 | A1 | 10/2011 | Hyong | | |
| 2012/0144746 | A1 | 6/2012 | Black et al. | | |
| 2015/0275498 | A1 * | 10/2015 | Belanger | E06B 5/01 | 210/164 |

FOREIGN PATENT DOCUMENTS

| | | |
|---|---|---|
| JP | S5664069 A | 6/1981 |
| WO | WO2011066601 A1 | 6/2011 |

OTHER PUBLICATIONS

PCT International Search Report and Written Opinion for PCT/GB2020/051682, dated Oct. 20, 2020, 15 pp.
Japanese Patent Office, Office Action issued in corresponding Application No. 2022-506580, dated Apr. 8, 2024, 5 pp.

* cited by examiner

COVER WITH ADJUSTABLE WIDTH

CROSS REFERENCE TO RELATED APPLICATIONS

This is a U.S. National Stage Application of, and claims the benefit to, PCT/GB2020/051682, filed Jul. 13, 2020, which claims priority to United Kingdom patent application s/n GB 1910947.9, filed Jul. 31, 2019, the contents of each is incorporated herein by reference in its entirety.

This disclosure relates to a cover for covering an opening, in particular an opening in a floor. This disclosure also relates to a method of covering an opening and a kit of parts for forming the cover.

BACKGROUND

Covers for covering openings are known. For garage inspection pits, the applicant's prior patent GB2472798 discloses one suitable cover. Typically, the cover is manufactured for a given garage inspection pit and installed in-place on site. The cover is formed from a parallel array of longitudinal members laterally spaced in a planar arrangement, with two pantograph arrangements pivotably connected to each of the longitudinal members, allowing the cover length to be varied. Access to the garage inspection pit can be provided by contracting the cover, or by removing the cover entirely. Access to the garage inspection pit can be at least partially prevented by providing the cover over the opening, and/or expanding the cover from the contracted position to cover the opening.

It is in this context that the present invention has been developed.

BRIEF SUMMARY OF THE DISCLOSURE

In accordance with the present disclosure there is provided a cover for covering an opening defined in a surface. The opening is defined between a first edge and a second edge. The first edge and the second edge define an opening width therebetween, shorter than a length of the opening. The cover has a cover width and is configured to be supported, in use, at the first edge and the second edge of the opening when the cover width is parallel to the opening width. The cover width is adjustable from a first cover width to a second cover width. The cover is configured to maintain the cover width at the second cover width, in use.

Thus, there is provided a cover, sometimes referred to as an access panel, which can be suitable for installation in openings of different widths. Previously, covers were manufactured to order to specific opening sizes. It will be understood that the cover is particularly of use where the openings are for garage inspection pits, sometimes referred to as vehicle inspection pits. The cover may be for fully covering the opening. The cover may be for partially covering the opening.

The cover may be configured to substantially permanently prevent adjustment of the cover width to the first cover width after activation of a retaining mechanism when the cover width is at the second cover width. Thus, after installation of the cover in the opening, the width of the cover cannot be changed. This ensures that the width of the cover is not accidentally shortened in width, allowing the cover to fall through the opening. Thus, the safety of the cover is improved. Activation of the retaining mechanism may be insertion of a retaining fastener through a retaining opening and penetration into the cover, to substantially prevent widthways expansion or contraction of the cover.

The cover may comprise a plurality of parallel members, each arranged to be provided between the first edge and the second edge of the opening. Each of the plurality of parallel members may be arranged to be extensibly connected to an adjacent parallel member of the plurality of parallel members. Thus, a length of the cover is adjustable. The parallel members may be extensibly connected in a lengthways direction, sometimes referred to as a longitudinal direction. Thus, the cover can vary in length in a particularly efficient manner, being relatively easy to manufacture and operate.

The plurality of parallel members may be connected via a pantograph linkage, sometimes referred to as a scissor mechanism, with each of the parallel members connected at a crossing point of the linkage, sometimes referred to as at an "X" of the linkage.

Each of the plurality of parallel members may be provided with at least one telescopic extension arm, configured to be slidably received in the parallel member to adjust the cover width from the first cover width to the second cover width. Thus, the cover can vary in width in a particularly efficient manner, being relatively easy to manufacture and operate during installation.

Of the plurality of parallel members and the at least one telescopic extension arm for each of the plurality of parallel members, in some embodiments, only the plurality of parallel members has defined therein an opening for receiving a retaining fastener to retain the cover width at the second cover width. In other words, the retaining fastener will need to be of a self-tapping type to penetrate through the telescopic extension arms as no opening is provided there. Advantageously, this ensures that a continuum of widths can be chosen, ensuring that the best possible fit of the cover to the opening is achievable. In other words, the width of the cover is not chosen from a limited, discrete plurality of possible options. The retaining fastener may be a self-tapping screw. The cover may comprise the retaining fastening.

Each of the plurality of parallel members may comprise two telescopic extension arms, one each extending from each of a first end and a second end of the respective parallel member. Thus, the plurality of parallel members can remain substantially centralised in the opening, and the length of the telescopic extension arms used to transmit any load from the parallel members to the edges of the opening can be reduced.

The cover may further comprise an extension stop moveable with at least one of the telescopic extension arms of the plurality of parallel members. The extension stop is configured to substantially prevent extension of at least one other of the telescopic extension arms of the plurality of parallel members beyond the at least one of the telescopic extension arms. Thus, during installation of the cover in the opening, the extension stop can make it easier to ensure all of the telescopic extension arms are at substantially the same extension.

The cover may further comprise movement means for facilitating movement of at least a portion of the cover at the first edge and the second edge of the opening. The movement means may be a skid, such as a relatively low-friction skid, for example a plastics skid. Alternatively, the movement means may be wheels or substantially any other component or surface treatment for ensuring easy movement of the cover relative to the edges of the opening.

The cover may be for covering a vehicle inspection pit. The vehicle inspection pit is sometimes referred to as a garage inspection pit.

The present disclosure extends to a method of covering an opening defined between a first edge and a second edge. The first edge and the second edge define a predetermined opening width therebetween. The method comprises: providing a cover, as described hereinbefore, at the opening; adjusting a cover width of the cover from a first cover width to a second cover width, the second cover width corresponding to the predetermined opening width such that the cover can cover the opening; and maintaining the cover width at the second cover width, in use. The second cover width may be greater than the first cover width. The method may comprise substantially permanently maintaining the cover width at the second cover width, in use.

When the cover comprises the plurality of parallel members and at least one telescopic extension arms, as described hereinbefore, the method may further comprise: affixing an extension stop to at least one of the telescopic extension arms of the plurality of parallel members, the extension stop moveable with the at least one of the telescopic extension arms, and configured to substantially prevent extension of at least one other of the telescopic extension arms of the plurality of parallel members beyond the at least one of the telescopic extension arms; extending the at least one other of the telescopic extension arms of the plurality of parallel arms to abut against the extension stop; securing the telescopic extension arms relative to the plurality of parallel members. The method may further comprise removing the extension stop from the at least one of the telescopic extension arms. Thus, the cover can be easily installed in an opening.

The present disclosure extends to a kit of parts for forming a cover for an opening defined in a surface, the opening defined between a first edge and a second edge. The first edge and the second edge define a predetermined opening width therebetween, shorter than a length of the opening. The kit of parts comprises: a cover as described hereinbefore; and one or more retaining fasteners for engaging with the cover to maintain the cover width at the second cover width.

The kit of parts may further comprise an extension stop moveable with at least one of the telescopic extension arms of the plurality of parallel members, the extension stop configured to substantially prevent extension of at least one other of the telescopic extension arms of the plurality of parallel members beyond the at least one of the telescopic extension arms.

The surface may be a ground surface. A maximum width of the cover may be less than 5 metres. A maximum width of the cover may be less than 2 metres. A minimum width of the cover may be greater than 50 centimetres. A maximum length of the cover may be less than 10 metres. A minimum length of the cover may be greater than 10 centimetres. A minimum length of the cover may be less than 1 metre.

BRIEF DESCRIPTION OF THE DRAWINGS

Embodiments of the invention are further described hereinafter with reference to the accompanying drawings, in which.

DETAILED DESCRIPTION

Figure 1:
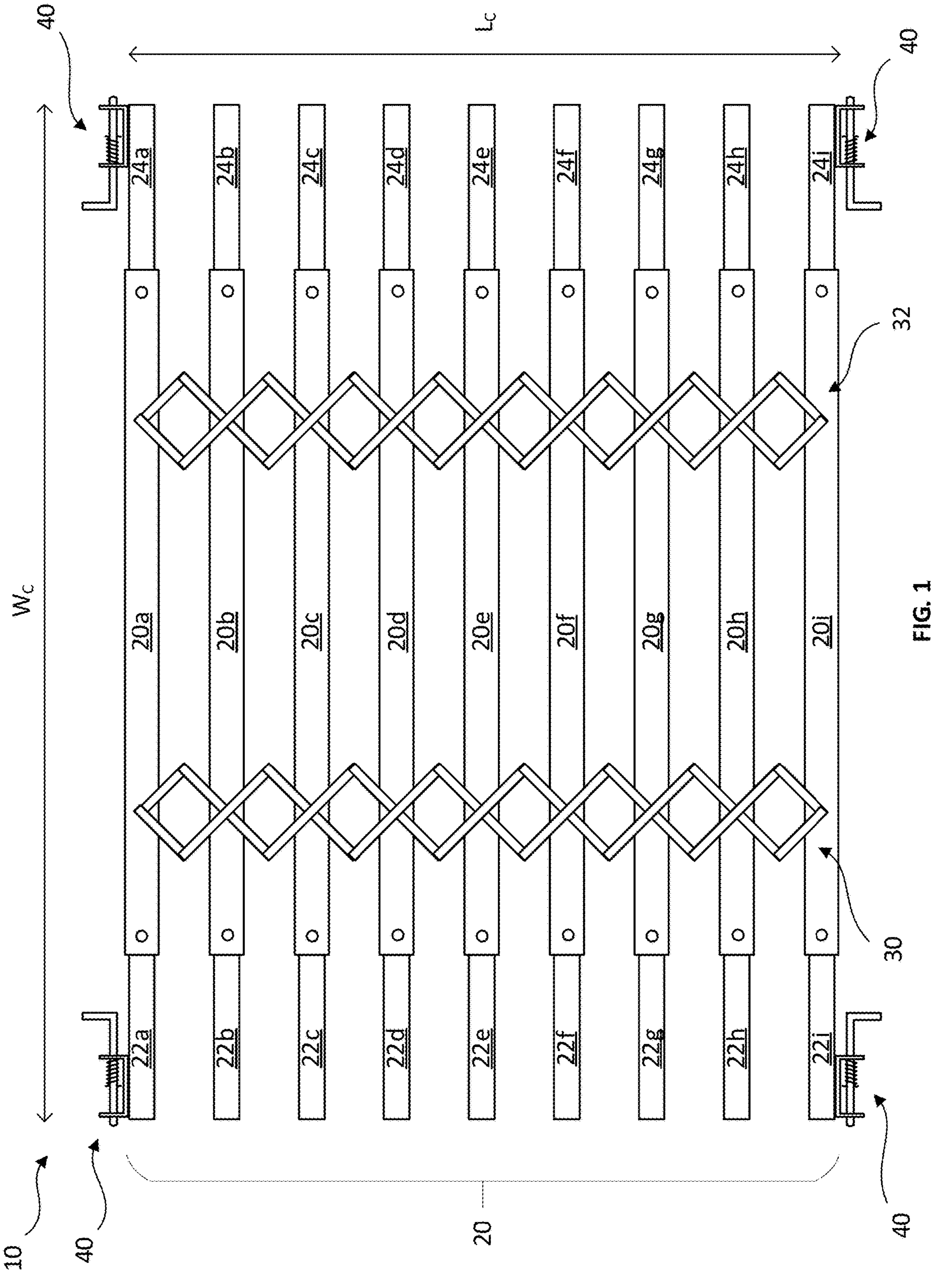
FIG. 1 is an illustration of a cover as disclosed herein.

FIG. 1 is an illustration of a cover as disclosed herein. The cover 10 is for covering an opening defined in a surface. Typically, the opening is a substantially horizontal opening. The cover is generally sufficiently strong to support the weight of a person, and/or a vehicle, and/or maintenance equipment. In this way, the safety hazard presented by the presence of the opening in the surface (through which a person or equipment could fall) is reduced or even completely negated. Sometimes, it will be understood that access to a void defined beyond the opening in the surface is required. The cover 10 can be removed to allow access to the void. In some examples, the cover 10 can be partially compressed to remove the cover 10 from a portion of the opening, without complete removal of the cover 10 from the opening. The use of the cover 10 is further described with reference to FIG. 4 hereinafter. In FIG. 1, the cover 10 is viewed from a top, with the cover 10 for use in covering an opening the other side of the cover 10.

The cover 10 defines a cover width We and a cover length $L_c$. The cover 10 is adjustable in a length direction between a collapsed configuration in which the cover length $L_c$ is substantially at a minimum and an expanded configuration in which the cover length $L_c$ is substantially at a maximum. As necessary, the presently described cover 10 may be provided in substantially any position between the collapsed configuration and the expanded configuration. In FIG. 1, the cover 10 is shown in a position between the collapsed configuration and the expanded configuration. Thus, the cover 10 can be adjusted in length to cover a number of different proportions of the opening. The cover 10 of the present disclosure is also adjustable in width between a first cover width and a second cover width. In this way, it will be appreciated (as will be explained further hereinafter) that the same cover 10 can be installed in either an opening of a first width, or with an opening of a second width, different from the first width.

The specific cover 10 disclosed herein comprises a plurality of parallel members 20, 20*a*, 20*b*, 20*c*, 20*d*, 20*e*, 20*f*, 20*g*, 20*h*, 20*i*. The plurality of parallel members 20, 20*a*, 20*b*, 20*c*, 20*d*, 20*e*, 20*f*, 20*g*, 20*h*, 20*i* are each arranged to be extensibly connected to adjacent parallel members 20*a*, 20*b*, 20*c*, 20*d*, 20*e*, 20*f*, 20*g*, 20*h*, 20*i* of the plurality of parallel members 20, to allow adjustment of the length of the cover 10. In this example, the plurality of parallel members 20, 20*a*, 20*b*, 20*c*, 20*d*, 20*e*, 20*f*, 20*g*, 20*h*, 20*i* are extensibly connected by an extension unit 30, 32, in the form of a first pantograph linkage 30 and a second pantograph linkage 32. The pantograph linkages 30, 32 are each pivotably linked to each of the plurality of parallel members 20, 20*a*, 20*b*, 20*c*, 20*d*, 20*e*, 20*f*, 20*g*, 20*h*, 20*i*. In this way, it can be seen that the pantograph linkages 30, 32, ensure that the plurality of parallel members 20, 20*a*, 20*b*, 20*c*, 20*d*, 20*e*, 20*f*, 20*g*, 20*h*, 20*i* remain equally spaced and parallel during adjustment of the length of the cover 10.

Each of the plurality of parallel members 20, 20*a*, 20*b*, 20*c*, 20*d*, 20*e*, 20*f*, 20*g*, 20*h*, 20*i* is provided with at least one telescopic extension arm, in this example a first telescopic extension arm 22*a*, 22*b*, 22*c*, 22*d*, 22*e*, 22*f*, 22*g*, 22*h*, 22*i* and a second telescopic extension arm 24*a*, 24*b*, 24*c*, 24*d*, 24*e*, 24*f*, 24*g*, 24*h*, 24*i*. For ease of explanation, among the plurality of parallel members 20, 20*a*, 20*b*, 20*c*, 20*d*, 20*e*, 20*f*, 20*g*, 20*h*, 20*i*, the second parallel member 20*b* will be described further below, but it will be understood that the description and explanation applies equally to any of the other parallel members with relevant changes to the reference numerals as appropriate.

The first telescopic extension arm 22*b* for the second parallel member 20*b* is telescopically received within the second parallel member 20*b*. In other words, the second parallel member 20*b* defines an open first end of sufficient size to receive the first telescopic extension arm 22*b* therein. Similarly, the second telescopic extension arm 24*b* for the second parallel member 20*b* is telescopically received within the second parallel member 20*b*, at an opposite end of the second parallel member 20*b* to the first telescopic extension arm 22*b* received therein. In other words, the second parallel member 20*b* further defined an open second end, opposite the open first end, of sufficient size to receive the second telescopic extension arm 24*b* therein. As will be described further with reference to FIG. 2 hereinafter, the second parallel member 20*b* also defines a portion of a retaining mechanism in the form of a first retaining opening and a second retaining opening, each defined in the second parallel member 20*b*, and arranged to receive a retaining fastener therein to engage with the telescopic extension arms 22*b*, 24*b* to substantially prevent further telescopic movement thereof relative to the second parallel member 20*b*. In this way, the cover 10 can be fixed in width during installation.

The cover 10 further comprises a locking mechanism 40 to reduce or even substantially prevent accidental adjustment of the length and longitudinal positioning of the cover 10 when covering the opening. In this example, the locking mechanism 40 is provided at each side of the first parallel member 20*a* and the ninth parallel member 20*i*, mounted to the first and second telescopic extension arms 22*b*, 24*b*, thereof. The functioning of the locking mechanisms 40 will be described further with reference to FIG. 2 hereinafter.

Figure 2:
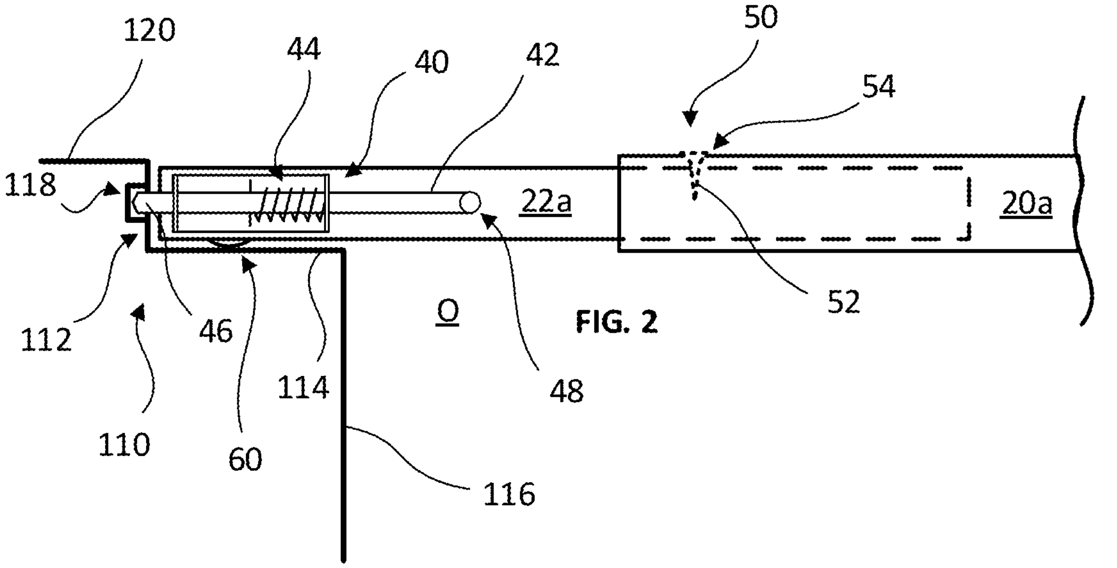
FIG. 2 is an illustration of a portion of the cover shown in FIG. 1.

FIG. 2 is an illustration of a portion of the cover 10 shown in FIG. 1. In particular, FIG. 2 shows a first parallel member 20*a* having a first telescopic extension arm 22*a* extending telescopically therefrom. In FIG. 2, the first parallel member 20*a* is viewed from a side-on direction. It will be understood that the first parallel member 20*a* is as described hereinbefore, and extends further than shown in FIG. 2. The first parallel member 20*a* is cut-off show that a greater amount of detail can be presented in the remaining components of the cover 10. The cover 10 is shown in-place covering an opening O defined between a first edge 110 and a second edge (not shown). As can be seen, typically the first edge 110 of the opening is provided with a first side-wall 112, a lip region 114 and a second side-wall 116. The first side-wall 112 and the second side-wall 116 are each substantially vertical and are connected via the lip region 114, arranged to be substantially horizontal. The opening O is ultimately defined within a ground surface 120. In this example, there are a plurality of locating openings 118 defined in the first side-wall 112. It will be understood that in other examples locating openings 118 may be provided elsewhere, such as in the lip region 114, or may even not be provided at all.

As described hereinbefore, the first telescopic extension arm 22*a* extending from the first parallel member 20*a* is provided with a locking mechanism 40. The locking mechanism 40 comprises a sliding bolt 42, biased outwards by a biasing mechanism 44, such as a spring 44. A tip 46 of the sliding bolt 42 is arranged to be receivable within the locating openings 118 in the first side-wall 112 of the opening O. In this example, the locking mechanism 40 further comprises a handle 48, provided at an end of the sliding bolt 42, opposite the tip 46, for retracting the sliding bolt 42 against the restoring action of the biasing mechanism 44. Where the locating openings 118 are provided in the lip region, it will be understood that the locking mechanism 40 may instead comprise a pin arranged to extend into a locating opening in the lip region; in other words, for a horizontal opening O, the pin may be a vertical pin extending downwards from a lower surface of the telescopic extension arm 22*a*.

As can be seen in FIG. 2, in this configuration, an extension of the first telescopic extension arm 22*a* from the first parallel member 20*a* has been fixed by activation of a retaining mechanism 50. The retaining mechanism 50 in the present example is activated by insertion of a retaining fastener 52 through a first retaining opening 54 defined in the first parallel member 20*a*. The retaining fastener 52 can be in the form of a self-tapping screw, arranged to penetrate into the first telescopic extension arm 22*a*, thereby securing the first telescopic extension arm 22*a* relative to the first parallel member 20*a*. A broken line representation is used in FIG. 2 to convey that the first telescopic extension arm 22*a* extends within the first parallel member 20*a*. Thus, the configuration of the cover 10 shown in FIG. 2 is when the cover is already installed in the opening O.

An underside of the first telescopic extension arm 22*a* is provided with movement means 60, for example in the form of a skid member 60, to facilitate easy movement of the cover 10 relative to the opening, and in particular, easy movement of the first telescopic extension arm 22*a* longitudinally along the lip region 114. The skid member 60 may be provided by a low-friction material, for example a plastics material, configured to allow easy manipulation of the cover 10 around the opening O.

It will be understood that other parallel members of the plurality of parallel members, as well as the other end of the first parallel member 20*a* may be substantially as described above in relation to the first parallel member 20*a*, though parallel members not being at the outermost edges of the cover 10 (in this example the first parallel member 20*a* and the ninth parallel member 22*i*) typically will not be provided with the locking mechanism 40.

Figure 3:
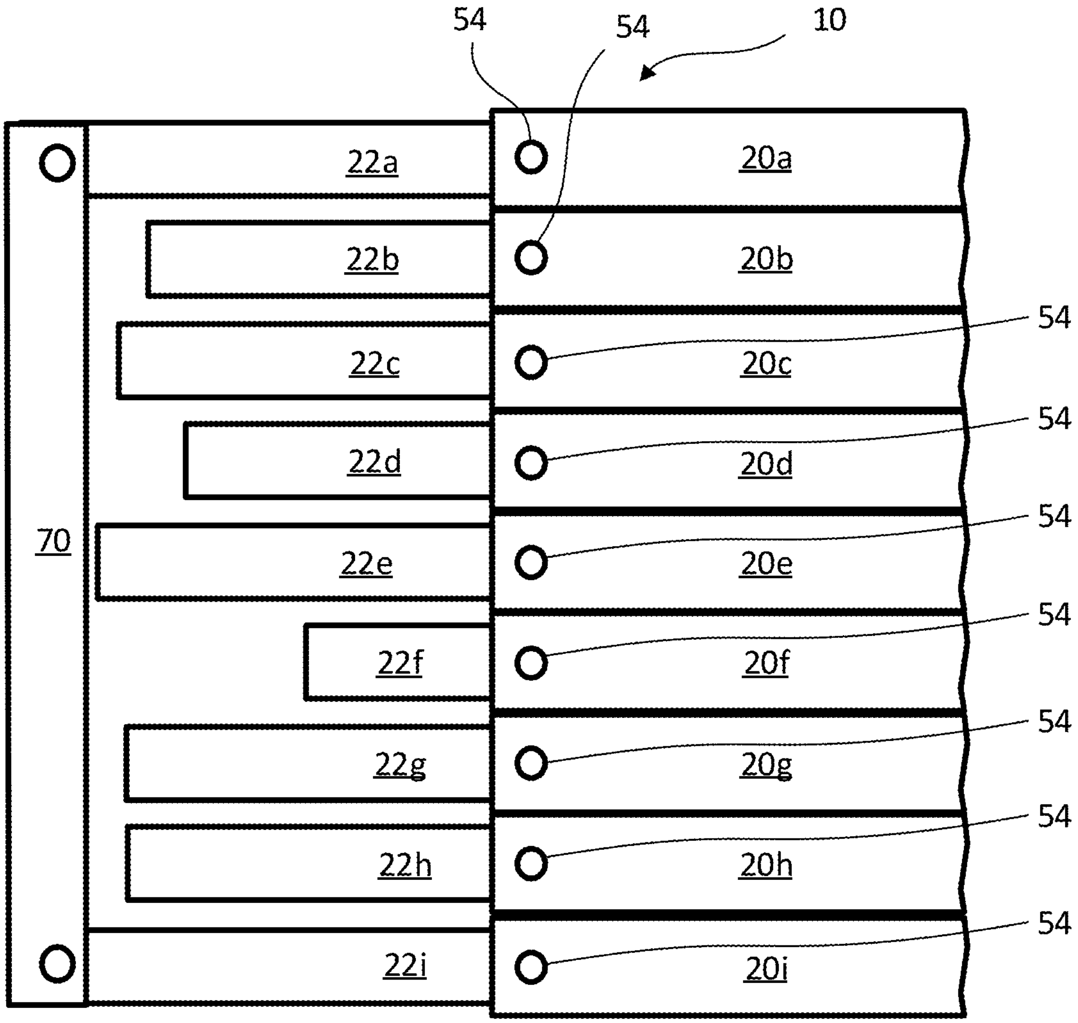
FIG. 3 is an illustration of a feature of the cover shown in FIGS. 1 and 2, used during installation of the cover

FIG. 3 is an illustration of a feature of the cover shown in FIGS. 1 and 2, used during installation of the cover. In other words, FIG. 3 shows the cover 10 prior to installation in the opening O, described with reference to FIG. 2 hereinbefore. The cover 10 is provided in the collapsed configuration, where the cover length $L_c$ is substantially at a minimum. An extension stop member 70 is provided to substantially prevent extension of any of the first telescopic extension arms 22*a*, 22*b*, 22*c*, 22*d*, 22*e*, 22*f*, 22*g*, 22*h*, 22*i* beyond at least one of any telescopic extension arms 22*a*, 22*i* connected to the extension stop member 70. As will be appreciated, FIG. 3, as in FIG. 2, shows only one portion of the cover 10, and substantially similar provisions can be provided on the other end of the cover 10, with a further extension stop member (not shown) for the second telescopic extension arms 24*a*, 24*b*, 24*c*, 24*d*, 24*e*, 24*f*, 24*g*, 24*h*, 24*i*. In this example, the extension stop member 70 is in the form of an L-bracket, secured to at least one (in this example two) of the first telescopic extension arms. In this example, the extension stop member 70 is secured to the first telescopic extension arms 22*a*, 22*i* of the first parallel member 20*a* and the ninth parallel member 20*i*. A vertical portion of the L-bracket providing the extension stop member 70 ensures that none of the first telescopic extension arms 22*a*, 22*b*, 22*c*, 22*d*, 22*e*, 22*f*, 22*g*, 22*h*, 22*i* can extend beyond the extension stop member 70. Advantageously, this makes it easy for the length of extension of the first telescopic extension arms 22*a*, 22*b*, 22*c*, 22*d*, 22*e*, 22*f*, 22*g*, 22*h*, 22*i* from the plurality of parallel members 20 to be set uniformly. Once a telescopic extension arm is in the correct extension position, the extension position can be maintained by activation of the retaining mechanism, for example using retaining fasteners through the retaining openings 54, substantially as described with reference to FIG. 2 hereinbefore. After the retaining mechanisms have been activated, the extension stop member 70 can be removed from the cover 10. In examples where the extension stop member 70 was secured to more than one of the telescopic extension arms, removal of the extension stop member 70 can subsequently allow the cover length $L_c$ to be altered as necessary to cover more or less of the opening O. A further benefit of the L-bracket design of the extension stop member 70 is that when the cover is located in the opening and the extension stop member 70 expanded to abut directly against the edges of the opening prior to securing the telescopic extension arm in position by activation of the retaining mechanism, on subsequent removal of the extension stop member 70 from the cover 10, a suitable tolerance will remain between an edge of the telescopic extension arms and the edges of the opening O to ensure smooth movement of the cover 10 within the opening.

Figure 4:
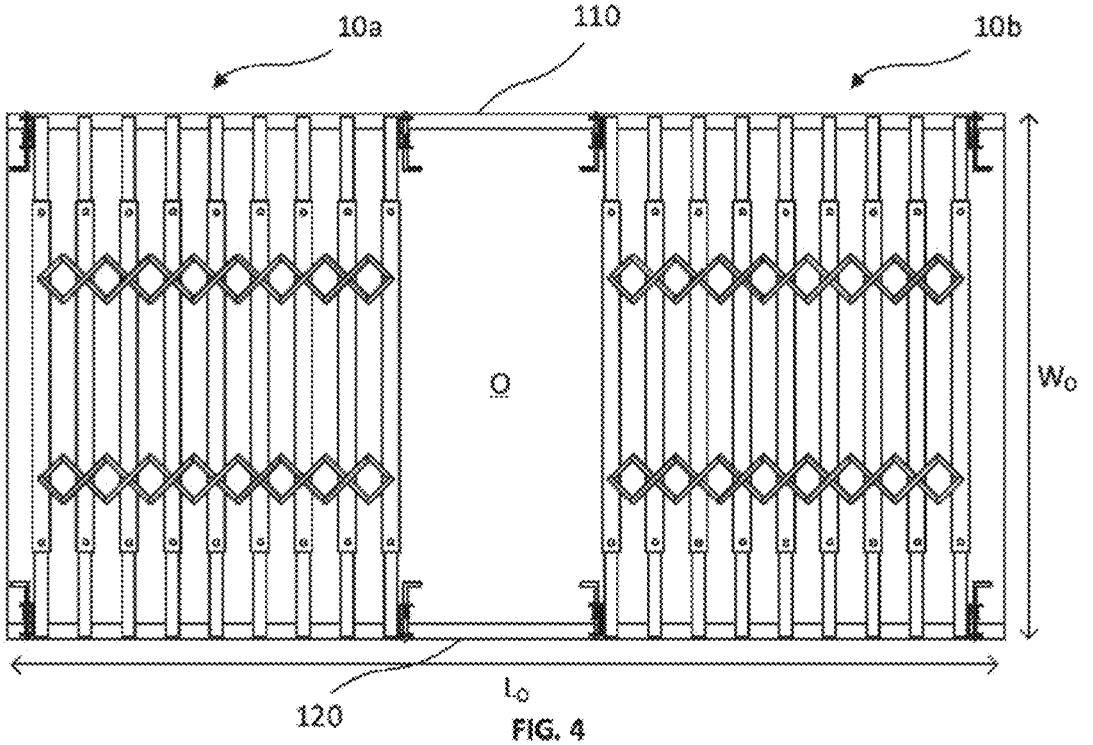
FIG. 4 is an illustration of the cover shown in FIGS. 1 to 3, in use for covering an opening.

FIG. 4 is an illustration of the cover shown in FIGS. 1 to 3, for covering an opening, in use. A first cover 10*a* and a second cover 10*b*, each substantially the same as the covers described hereinbefore with reference to FIGS. 1 to 3, are shown in-place partially covering an opening O defined between a first edge 110 and a second edge 120. The first edge 110 and the second edge 120 define an opening width $W_o$ therebetween. The opening also defines an opening length $L_o$, longer than the opening width $W_o$. It will be understood that, typically, length is transverse to width. As can be seen, the covers 10*a*, 10*b* are each configured to be supported, in use, at the first edge 110 and the second edge 120 of the opening when the cover width $W_c$ is parallel to the opening width $W_o$. As described hereinbefore, the cover width $W_c$ is adjustable from a first cover width to a second cover width, during installation of the cover 10*a*, 10*b* in the opening, such that the cover 10*a*, 10*b* is configured to maintain the cover width $W_c$ at the second cover width, in use. In the arrangement shown in FIG. 4, it will be understood that complete coverage of the opening O can be achieved by extension of either or both of the first cover 10*a* and the second cover 10*b* in the length direction. Access to one end of the opening O can be provided either by removal of one or both of the covers 10*a*, 10*b*, or alternatively by movement of the covers 10*a*, 10*b* to an opposite end of the opening O, in the lengthwise direction, and by contraction of the covers 10*a*, 10*b* into their collapsed configuration, as described hereinbefore. The position and lengthwise extension of the covers 10*a*, 10*b* can be maintained via use of the locking mechanisms 40, as described hereinbefore.

Figure 5:
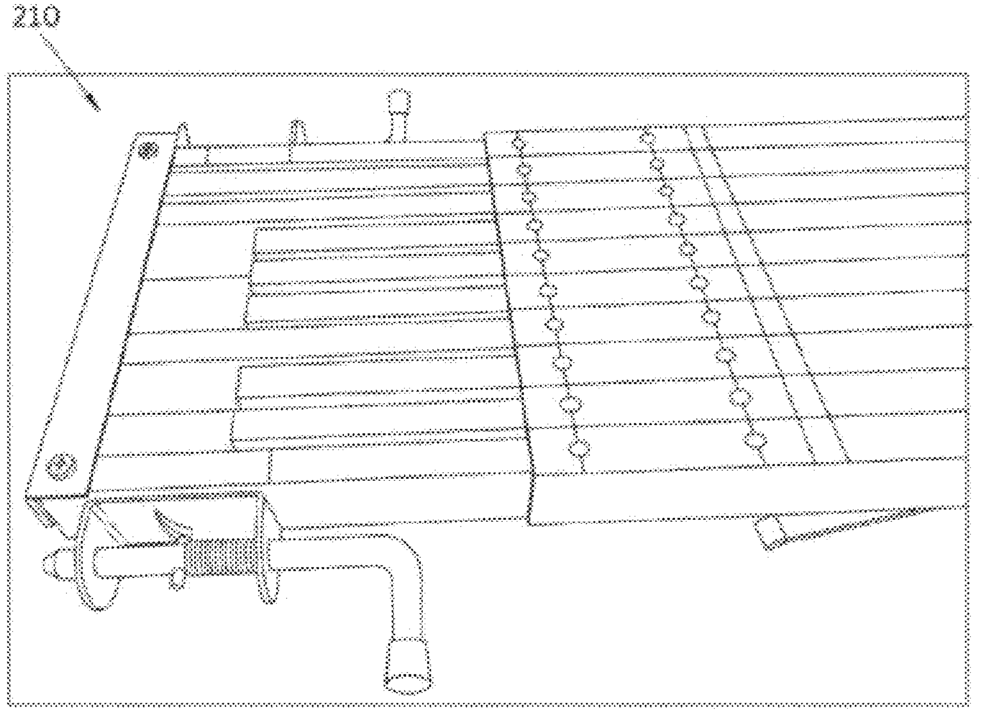
FIG. 5 is an illustration of an example of a cover as disclosed herein.

FIG. 5 is an illustration of an example of a cover as disclosed herein. The cover 210 is substantially similar is form and function to the covers described hereinbefore, apart from any hereinafter noted differences. The cover 210 includes ten parallel members, instead of the nine parallel members shown in the covers of FIGS. 1 to 4. The parallel members of the cover 210 of FIG. 5 also include two retaining openings for each of the telescopic extension arms. When retaining fasteners are engaged with a telescopic extension arm through both of the retaining openings, this improves a stability of the cover 210, when installed. It will be understood that an outer extent of a cross-section of the telescopic extension arms must be smaller than an inner extent of a cross-section of the parallel members to facilitate telescopic movement of the telescopic extension arms therein. Typically, without securing the telescopic extension arm relative to the parallel member using two retaining fasteners, slight movement of the telescopic extension arm may still occur, which would decrease the stability, or at least the apparent stability of the cover 210. A further benefit is that use of two retaining fasteners provide redundancy in the highly unlikely event of failure of one of the retaining fasteners.

It will be understood that the cover 10 described hereinbefore may be formed from any suitable material and in any suitable length, width or other sizes as necessary to provide a cover for covering an opening in a surface. In at least some examples, it will be important that the cover 10 is able to support a person, or even heavier loads such as a vehicle, thereon.

Although the present disclosure has described a cover for covering an opening of a garage inspection pit, sometimes referred to as a vehicle inspection pit, it will be understood that the cover can also be used to cover any other type of opening, for example openings where the width of the opening can vary between different openings, by design or manufacturing tolerance.

Throughout the description and claims of this specification, the words “comprise” and “contain” and variations of them mean “including but not limited to”, and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An inspection pit cover for covering an inspection pit opening defined in a surface and adapted to support a person, the opening defined between first and second edges, and an opening width defined between the first and second edges that is shorter than a length of the opening, the inspection pit cover comprising:

a cover width, wherein the inspection pit cover is configured to be supported, during use, at the first and second edges of the opening when the cover width is substantially parallel to the opening width, wherein the cover width is adjustable from a first cover width to a second cover width, and the cover is adapted to maintain the cover width at the second cover width during use;

parallel members, each of the parallel members is arranged to be provided between the first and second edges of the opening, and extensibly connected to an adjacent parallel member of the parallel members, such that a length of the cover is adjustable, wherein the parallel members respectively include telescopic extension arms that are adapted to be slidably received in the respective parallel members to adjust the cover width from the first cover width to the second cover width;

retaining mechanisms respectively provided on the parallel members and configured to maintain the cover width at the second cover width, wherein the retaining mechanisms are respectively defined by retaining openings respectively receiving retaining fasteners, and each retaining opening is defined by only the respective parallel member; and wherein the retaining fasteners engage each of the telescopic extension arms to substantially permanently prevent adjustment of the cover width to the first cover width after activation of the retaining mechanisms when the cover is at the second cover width.

2. The inspection pit cover as claimed in claim 1, wherein each of the parallel members includes two of said telescopic extension arms, one each of the telescoping extension arms extending from each of a first end and a second end of the respective parallel member.

3. The inspection pit cover as claimed in claim 1, further comprising an extension stop moveable with at least one of the telescopic extension arms, the extension stop is adapted to substantially prevent extension of at least one of the other of the telescopic extension arms beyond the at least one of the telescopic extension arms which is moveable with the extension stop.

4. The inspection cover as claimed in claim 1, wherein the inspection pit cover is adapted to cover a vehicle inspection pit.

5. A method of covering an inspection pit opening defined between a first edge and a second edge, and defining a predetermined opening width therebetween, the method comprising:

providing an inspection pit cover as claimed in claim 1 at the opening;

adjusting a cover width of the cover from a first cover width to a second cover width, the second cover width corresponding to the predetermined opening width such that the cover can cover the opening; and maintaining the cover width at the second cover width, in use.

6. A method as claimed in claim 5, further comprising:

affixing an extension stop to at least one of the telescopic extension arms, the extension stop moveable with the at least one of the telescopic extension arms, and adapted to substantially prevent extension of at least one of the other of the telescopic extension arms beyond the at least one of the telescopic extension arms which is moveable with the extension stop;

extending the at least one other of the telescopic extension arms to abut against the extension stop;

securing the telescopic extension arms relative to the parallel members; and removing the extension stop from the at least one of the telescopic extension arms.

7. A kit for forming a cover for an inspection pit opening defined in a surface, the opening defined between a first edge and a second edge, and defining a predetermined opening width therebetween, shorter than a length of the opening, the kit of parts comprising:

a cover as claimed in claim 1; and the retaining fasteners for being received in the retaining openings and engaging with the cover to maintain the cover width at the second cover width.

8. The kit of parts as claimed in claim 7, further comprising an extension stop moveable with at least one of the telescopic extension arms, the extension stop adapted to substantially prevent extension of at least one other of the telescopic extension arms beyond the at least one of the telescopic extension arms which is moveable with the extension stop.

9. The inspection pit cover as claimed in claim 1, further comprising a skid for facilitating movement of at least a portion of the cover at the first edge and the second edge of the opening.

10. The inspection pit cover as claimed in claim 1, further comprising one or more wheels for facilitating movement of at least a portion of the cover at the first edge and the second edge of the opening.

* * * * *